United States Patent
Koike et al.

(10) Patent No.: US 8,404,022 B2
(45) Date of Patent: Mar. 26, 2013

(54) METHOD OF CONCENTRATING OZONE GAS AND APPARATUS THEREFOR

(75) Inventors: Kunihiko Koike, Moriyama (JP);
Sadaki Nakamura, Moriyama (JP);
Naohisa Makihira, Moriyama (JP);
Koichi Izumi, Moriyama (JP);
Shigenori Takatori, Shizuoka (JP)

(73) Assignee: Iwatani Corporation, Osaka-Shi (JP)

( * ) Notice: Subject to any disclaimer, the term of this patent is extended or adjusted under 35 U.S.C. 154(b) by 253 days.

(21) Appl. No.: 13/054,999

(22) PCT Filed: Jul. 23, 2008

(86) PCT No.: PCT/JP2008/063152
§ 371 (c)(1),
(2), (4) Date: Jan. 20, 2011

(87) PCT Pub. No.: WO2010/010610
PCT Pub. Date: Jan. 28, 2010

(65) Prior Publication Data
US 2011/0123430 A1    May 26, 2011

(51) Int. Cl.
*B01D 53/02*    (2006.01)
(52) U.S. Cl. .................. 95/26; 95/96; 95/138; 96/116; 96/121
(58) Field of Classification Search .................. None
See application file for complete search history.

(56) References Cited

U.S. PATENT DOCUMENTS 8,012,241 B2 * 9/2011 Koike et al. ............ 95/95
2010/0005961 A1 * 1/2010 Koike et al. ............ 95/95

FOREIGN PATENT DOCUMENTS

JP    2003-171104    6/2003
WO    2006/062534    5/2008

* cited by examiner

*Primary Examiner* — Duane Smith
*Assistant Examiner* — Phillip Shao
(74) *Attorney, Agent, or Firm* — Rankin, Hill & Clark LLP

(57) ABSTRACT

A method of concentrating ozone gas in which, although the apparatus configuration is simple, ozone gas of a predetermined concentration can be efficiently taken out, and an apparatus therefor are provided. In a method of concentrating ozone gas in which an ozone-oxygen mixture gas is acted in an adsorbing column that is filled with an adsorbent, to cause the adsorbent to selectively adsorb the ozone gas, and the selectively adsorbed ozone gas is desorbed, thereby concentrating and purifying the ozone gas, the ozone-oxygen mixture gas is acted on the adsorbent in a non-cooled state to cause the ozone gas to be selectively adsorbed to the adsorbent, the adsorbing column is vacuumed when performing an operation desorbing of the ozone gas, thereby desorbing the ozone gas from the adsorbent, and an initial amount of the leading out of the desorbed ozone gas is not recovered, thereby obtaining high-concentration ozone gas.

3 Claims, 3 Drawing Sheets

| CONCENTRATION OF GENERATED OZONE | | GENERATED FLOW AMOUNT | CONCENTRATION OF RAW MATERIAL OZONE | FLOW AMOUNT OF RAW MATERIAL OXYGEN | YIELD | CYCLE SETTING | | | | | COLUMN PRESSURE AFTER T5 |
|---|---|---|---|---|---|---|---|---|---|---|---|
| | | | | | | T1 PRESSURISING | T2 ADSORPTION | T3 POST-ADSORPTION EVACUATION | T4 STABILIZATION | T5 PRE-DESORPTION EVACUATION | |
| g/m³ | vol.% | slm | g/m³ | slm | | sec | sec | sec | sec | sec | kPa |
| 1714 | 80.0 | 0.220 | 131 | 15.0 | 0.20 | 5.0 | 80.0 | 2.0 | 1.0 | 33.0 | -89.9 |
| 1680 | 78.4 | 0.244 | 131 | 15.0 | 0.21 | 5.0 | 80.0 | 2.0 | 1.0 | 30.0 | -89.3 |
| 1622 | 75.7 | 0.286 | 131 | 15.0 | 0.24 | 5.0 | 80.0 | 2.0 | 1.0 | 25.0 | -88.2 |
| 1532 | 71.5 | 0.353 | 131 | 15.0 | 0.28 | 5.0 | 80.0 | 2.0 | 1.0 | 20.0 | -86.3 |
| 1438 | 67.1 | 0.433 | 131 | 15.0 | 0.32 | 5.0 | 80.0 | 2.0 | 1.0 | 15.0 | -83.8 |
| 1292 | 60.3 | 0.559 | 131 | 15.0 | 0.38 | 5.0 | 80.0 | 2.0 | 1.0 | 10.0 | -79.0 |
| 1091 | 50.9 | 0.797 | 131 | 15.0 | 0.45 | 5.0 | 80.0 | 2.0 | 1.0 | 5.0 | -67.5 |
| 928 | 43.3 | 1.035 | 131 | 15.0 | 0.50 | 5.0 | 80.0 | 2.0 | 1.0 | 2.0 | -53.0 |
| 830 | 38.7 | 1.300 | 131 | 15.0 | 0.59 | 5.0 | 80.0 | 2.0 | 1.0 | 0.0 | -35.0 |

FIG. 2

METHOD OF CONCENTRATING OZONE GAS AND APPARATUS THEREFOR

TECHNICAL FIELD

The present invention relates to a method of supplying ozone gas which is concentrated to a predetermined concentration range, to an ozone consumption facility such as a semiconductor production facility, and an apparatus therefor, and more particularly to a method of purifying ozone gas generated by an ozone generator (ozonizer) and supplying the purified ozone gas as concentrated ozone gas in a predetermined concentration range, and an apparatus therefor.

BACKGROUND ART

Usually, ozone gas is generated by supplying oxygen gas supplied from an oxygen cylinder or separated from the air to an ozone generator. However, even when ozone gas is generated by using oxygen gas supplied from an oxygen cylinder, the generated ozone gas exists in the oxygen gas with only a concentration of about 5 to 10 vol %. Moreover, ozone gas has a property that it is strong in self-decomposability, and hence it self-decomposes while passing through an ozone-gas supply passage, the concentration becomes much lower in a stage where it is supplied to an ozone-gas consumption facility, and besides the supply-concentration is unstable. In the field of semiconductor production, the use of the oxidation activity of ozone in formation of an oxidation film on a substrate or the like is increasing. In this case, it is desired to supply ozone gas of a stable middle concentration so as to stably produce an oxidation film of an appropriate thickness within a short period of time.

From this point of view, a technique is known in which ozone gas is concentrated and purified by supplying ozone-oxygen mixture gas from an ozone generator to an adsorbing column filled with an ozone adsorbent (Patent Literature 1). In this case, in the case of condensing ozone by adsorbing it, however, the adsorbent is cooled to enhance its adsorbing ability, and the ozone-oxygen mixture gas is acted on the adsorbent retained in this low-temperature state, thereby causing the ozone gas to be preferentially adsorbed by the adsorbent so as to raise the temperature, or controlling the pressure in the adsorbing column so that the ozone gas is desorbed from the adsorbent. Therefore, there is a problem in that cooling/heating cycles and pressurizing/depressurizing cycles are required to concentrate ozone, with the result that extra energy is necessary and the apparatus is enlarged. In addition, the temperature of the adsorbent exerts a large influence on the condensing property. Consequently, there are further problems in that a prolonged time is required to lower the temperature of the adsorbent to a pre-determined one after the desorbing step, and that its control is complicated.

Therefore, the present applicant has proposed a technique in which an ozone-oxygen mixture gas is acted on an adsorbent in a non-cooled state to cause the ozone gas to be selectively adsorbed by the adsorbent, and the adsorbing column is vacuumed when performing an operation of desorbing the ozone gas, thereby desorbing the ozone gas from the adsorbent (Patent Literature 2).

Patent Literature 1: Japanese Patent Application Laid-Open No. 2003-171104
Patent Literature 2: WO2008-062534

SUMMARY OF THE INVENTION

Problem to be Solved by the Invention

In the previously proposed technique in which an ozone-oxygen mixture gas is acted on an adsorbent in a non-cooled state to cause the ozone gas to be selectively adsorbed by the adsorbent, and the adsorbing column is vacuumed when performing an operation of desorbing the ozone gas, thereby desorbing the ozone gas from the adsorbent, oxygen-rich ozone gas (low concentration ozone gas) is led out in an initial stage of gas leading out of the adsorbing column, and ozone gas desorbed from the adsorbent is gradually led out, whereby the concentration of the ozone gas in the led-out gas is raised, so that high-concentration ozone gas can be obtained. Therefore, a buffer tank is disposed in a gas lead-out passage, and the concentration of the led-out ozone gas is averaged, so that concentrated ozone gas of a stable concentration is supplied.

Recently, however, a request for supply of ozone gas of a higher concentration is growing mainly in the field of semiconductor production.

The invention has been conducted in view of this point, and has an object to provide a method of concentrating ozone gas in which, although the apparatus configuration is simple, ozone gas of a high concentration can be efficiently taken out, and an apparatus therefor.

Means for Solving the Problem

In order to accomplish the object, the invention set forth in claim 1 is characterized in that the ozone-oxygen mixture gas is acted on an adsorbent in a non-cooled state to cause ozone gas to be selectively adsorbed to the adsorbent; an adsorbing column is vacuumed when performing an operation of desorbing the ozone gas, thereby desorbing the ozone gas from the adsorbent; for a constant time period after start of vacuuming, led-out ozone gas which is led out of the adsorbing column is discarded; and, after elapse of the constant time period, the led-out ozone gas which is led out of the adsorbing column is recovered. The invention set forth in claim 3 is characterized in that at least two adsorbing columns each of which is filled with an adsorbent are arranged in parallel to each other, a gas-introduction valve, a gas lead-out valve, and a gas-discharge valve are attached to each of the adsorbing columns, a gas-introduction passage to which an ozone generator is attached is connected to the gas-introduction valve, a purified ozone-gas lead-out passage in which a vacuum pump and an passage switching valve are sequentially attached is connected to the gas lead-out valve, a gas-discharge passage to which an ozone decomposer is attached is connected to the gas-discharge valve, the gas-introduction valve and gas-discharge valve which are attached to each of the adsorbing columns are configured to open and close synchronously, the gas-introduction valve and gas lead-out valve which are attached to a same one of the adsorbing columns are controlled to alternatively open, the valves are switchingly controlled so that an adsorbing step in which the adsorbing columns communicate with the gas-introduction passage, and a desorbing step in which the adsorbing columns communicate with the purified ozone-gas lead-out passage are alternately repeated, and, in a state where the adsorbing columns communicate with the purified ozone-gas lead-out passage, the passage switching valve is switchingly controlled to a state where purified ozone gas flowing through the purified ozone-gas lead-out passage is discarded, and a state where the purified ozone gas is recovered.

Here, the adsorbent in a non-cooled state means that the adsorbent is in a state where the thermal energy is not supplied from the external so as to enhance the adsorbing ability of the adsorbent. Therefore, slight cooling for preventing the temperature of the adsorbent from being raised by the reaction heat which is generated in a reaction with the ozone falls within a scope of the non-cooling state.

Effects of the Invention

The invention is configured so that the ozone-oxygen mixture gas generated by the ozone generator acts on the adsorbent retained in a so-called normal temperature state without cooling the adsorbent in order to enhance its adsorbing ability, thereby causing the ozone gas to be preferentially adsorbed to the adsorbent, and, in desorption, the ozone gas is vacuum desorbed by the function of the vacuum pump attached to the gas lead-out passage. Although the adsorbing amount is smaller as compared with the technique in which the adsorbent is cooled to adsorb the ozone gas, therefore, a high desorption rate can be maintained.

When concentrated ozone gas is to be led out of an adsorbing column, in an initial stage of the leading out, then, the led-out ozone gas is discarded for a constant time period, and, after elapse of the constant time period, the led-out ozone is recovered. Therefore, oxygen-rich ozone gas in the initial stage of the leading out is discarded, and only ozone-rich led-out gas which is desorbed from the adsorbent is recovered. Therefore, high-concentration ozone gas can be recovered and used.

BRIEF DESCRIPTION OF THE DRAWINGS

FIG. 2 is a table showing characteristics of an ozone concentrating process.

DESCRIPTION OF REFERENCE NUMERALS

1 . . . adsorbent, 2 . . . adsorbing column, 4 . . . gas-introduction passage, 5 . . . purified ozone-gas lead-out passage, 6 . . . gas-discharge passage, 7 . . . gas-introduction valve, 8 . . . ozone generator, 10 . . . gas lead-out valve, 11 . . . vacuum pump, 12 . . . passage switching valve, 17 . . . gas-discharge valve, 18 . . . ozone decomposer.

BEST MODE FOR CARRYING OUT THE INVENTION

Figure 1:
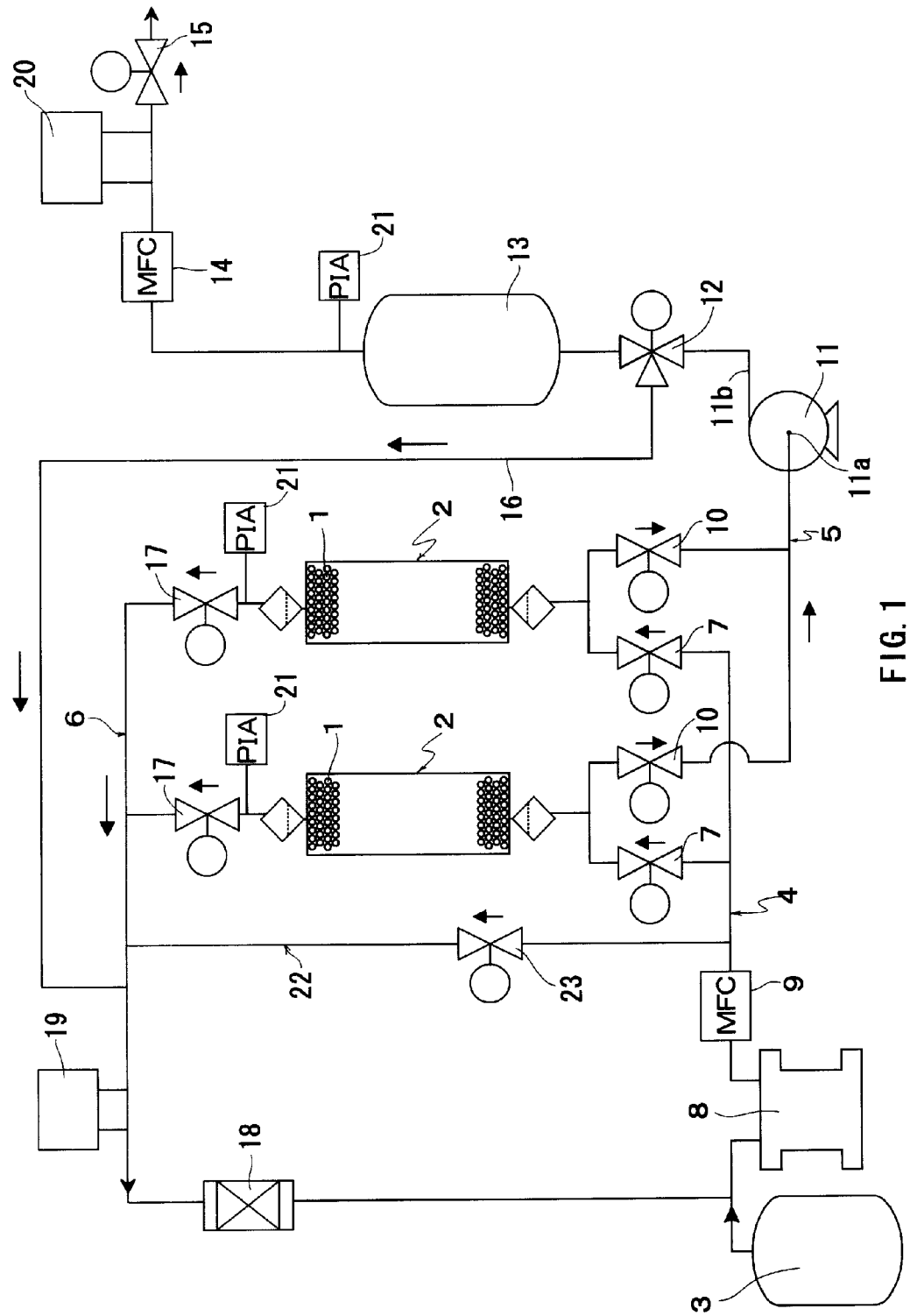
FIG. 1 is a system flow chart showing an example of an embodiment of the invention.

FIG. 1 is a system flow chart showing an example of an embodiment of the invention. The ozone-gas condensing apparatus has: adsorbing columns (2) each of which is filled with an adsorbent (1) such as silica gel that selectively adsorbs ozone gas; a gas-introduction passage (4) which communicatingly connects an ozone raw-material gas source (3) such as an oxygen-gas storing vessel and the adsorbing columns (2); a purified ozone-gas lead-out passage (5) led out of the adsorbing columns (2); and a through-gas gas-discharge passage (6) led out of the adsorbing columns (2). In the embodiment, two adsorbing columns (2) are arranged in parallel with each other, and configured so that, when one of the adsorbing columns is in an adsorbing step, the other is in a desorbing step.

The gas-introduction passage (4) is connected to each of the adsorbing columns (2) through a gas-introduction valve (7). An ozone generator (8) and a mass flow controller (9) are sequentially arranged in the gas-introduction passage (4) in the order starting from the upstream side. Ozone-oxygen mixture gas generated by the ozone generator (8) is alternatively supplied to each of the adsorbing columns (2) at a constant flow amount by controlling switchover of the gas-introduction valves (7).

On the other hand, the purified ozone-gas lead-out passage (5) is connected to each of the adsorbing columns (2) through a gas lead-out valve (10). A diaphragm vacuum pump (11), a passage switching valve (12), a buffer tank (13), a mass flow controller (14), and a flow-passage opening valve (15) are sequentially placed in the purified ozone-gas lead-out passage (5) in the order starting from the side of the adsorbing columns. The adsorbing columns (2) are alternatively communicated with a suction port (11a) of the diaphragm vacuum pump (11) by controlling switchover of the gas lead-out valve (10). Switching of the passage switching valve (12) enables an ejection port (11b) of the diaphragm vacuum pump (11) to be alternatively switched to a state where the ejection port communicates with the buffer tank (13), and that where the ejection port communicates with the discharge passage (6) via a connecting passage (16).

Further, the gas-discharge passage (6) is connected to each of the adsorbing columns (2) through a gas-discharge valve (17). An ozone decomposer (18) is placed in the gas-discharge passage (6), and the outlet of the ozone decomposer (18) is communicatingly connected to the upstream side of the ozone generator (8) in the gas-introduction passage (4). The gas-discharge valve (17) attached to each of the adsorbing columns (2) is opened and closed interlockingly with the opening and closing operation of the gas-introduction valve (7) attached to the same adsorbing column (2), so that, when the ozone-oxygen mixture gas is supplied into the adsorbing columns (2), it is opened so as to supply part of oxygen gas which is not adsorbed to the adsorbent (1), and ozone gas which remains as a result of partial adsorption, to the ozone decomposer (18).

In FIG. 1, the reference numeral (19) denotes an ozone-concentration detector which is attached to an inlet portion of the ozone decomposer (18) in the gas-discharge passage (6), (20) denotes an ozone-concentration detector which is attached to the outlet side of the mass flow controller (14) in the purified ozone-gas lead-out passage (5), (21) denotes pressure gages which indicate the inner pressures of the adsorbing columns (2) and the buffer tank (13), respectively, (22) denotes a by-pass passage which communicatingly connects the downstream side of the mass flow controller (9) placed in the gas-introduction passage (4) to an inlet portion of the ozone-concentration detector (17) in the gas-discharge passage (6), and (23) denotes a flow-passage shut-off valve which is attached to the by-pass passage (22).

In the thus configured ozone condensing apparatus, in a state where the gas-introduction valve (7) and the gas-discharge valve (17) are opened and the gas lead-out valve (10) is closed, the ozone-oxygen mixture gas generated in the ozone generator (8) is supplied to one of the adsorbing columns (2) to pass through the adsorbing column (2). At this time, the adsorbent (1) is maintained in a so-called normal temperature state (left standing state) without being externally provided with any heating or cooling thermal energy. As for the ozone-oxygen mixture gas supplied to the adsorbing column (2), the ozone gas component in the mixture is adsorbed to the adsorbent (1), and part of the ozone gas which is not adsorbed, and which remains, and oxygen gas as a carrier gas are fed from the gas-discharge passage (6) into the ozone decomposer (18).

When the ozone-oxygen mixture gas is flown through the adsorbing column (2) for a predetermined period of time and is adsorbed by the adsorbent (1) in a predetermined amount, for the adsorbing column (2) through which the ozone-oxygen mixture gas is flown until now, the gas-introduction valve (7) and the gas-discharge valve (17) are closed, and the gas lead-out valve (10) is opened, so that the interior of the adsorbing column (2) communicates with the vacuum pump (11) and the internal pressure of the adsorbing column (2) is reduced, thereby causing the ozone component to be vacuum desorbed from the adsorbent (1).

At this time, immediately after the gas lead-out valve (10) is opened, oxygen-rich ozone gas is led out. After the gas lead-out valve (10) is opened, therefore, the passage switching valve (12) attached to the purified ozone-gas lead-out passage (5) is switched for a predetermined time period to a state where the connecting passage (16) and the purified ozone-gas lead-out passage (5) communicate with each other, whereby the led-out ozone gas which is led out of the adsorbing column (2) is returned to the gas discharge passage (6) via the connecting passage (16).

When, as a result of the pressure reduction process for a constant time period, the discharging of unadsorbed gas in the adsorbing column (2), and oxygen gas which is preferentially desorbed from the adsorbent (1) advances, the passage switching valve (12) is switched to a state where the vacuum pump (11) communicates with the buffer tank (13), and purified ozone gas which is desorbed from the adsorbent (1) is supplied to the buffer tank (13).

Even when the concentration of the desorbed ozone gas from the adsorbing column (2) is varied, the purified ozone gas can be averaged within the buffer tank (13) by temporarily storing it in the buffer tank (13), can be supplied to an ozone consumption facility or the like in a state where the concentration is maintained within a given range. In this case, the purified ozone gas supplied to the buffer tank (13) is the ozone gas component which is desorbed after the oxygen gas component adsorbed to the adsorbent (1) is preferentially desorbed therefrom, and hence becomes ozone gas having a purity which is very close to 100%. Therefore, the ozone gas stored in the buffer tank (13) is a high-purity gas having a purity of 80 vol % or more.

During the period when the one adsorbing column (2) performs the desorbing operation, the other adsorbing column (2) performs the adsorbing operation, so that absorption and desorption are alternately performed by the two adsorbing columns (2), (2), and the purified ozone-gas is continuously taken out. The adsorbing columns (2) may be three or more. When timings of switching valves for three or more adsorbing columns (2) are controlled, purified ozone-gas can be continuously taken out.

Besides, as for the adsorbent in this case, high-purity silica gel containing a slight amount of metal components is preferable. However, it may be an ordinary adsorbent such as silica gel or zeolite.

In the case where an ozone use facility side allows variation of the ozone gas concentration within a constant concentration range, the buffer tank (13) may be omitted, and the purified ozone-gas which is sucked and discharged by the vacuum pump (11) may be directly supplied to an ozone use facility.

Figure 3:
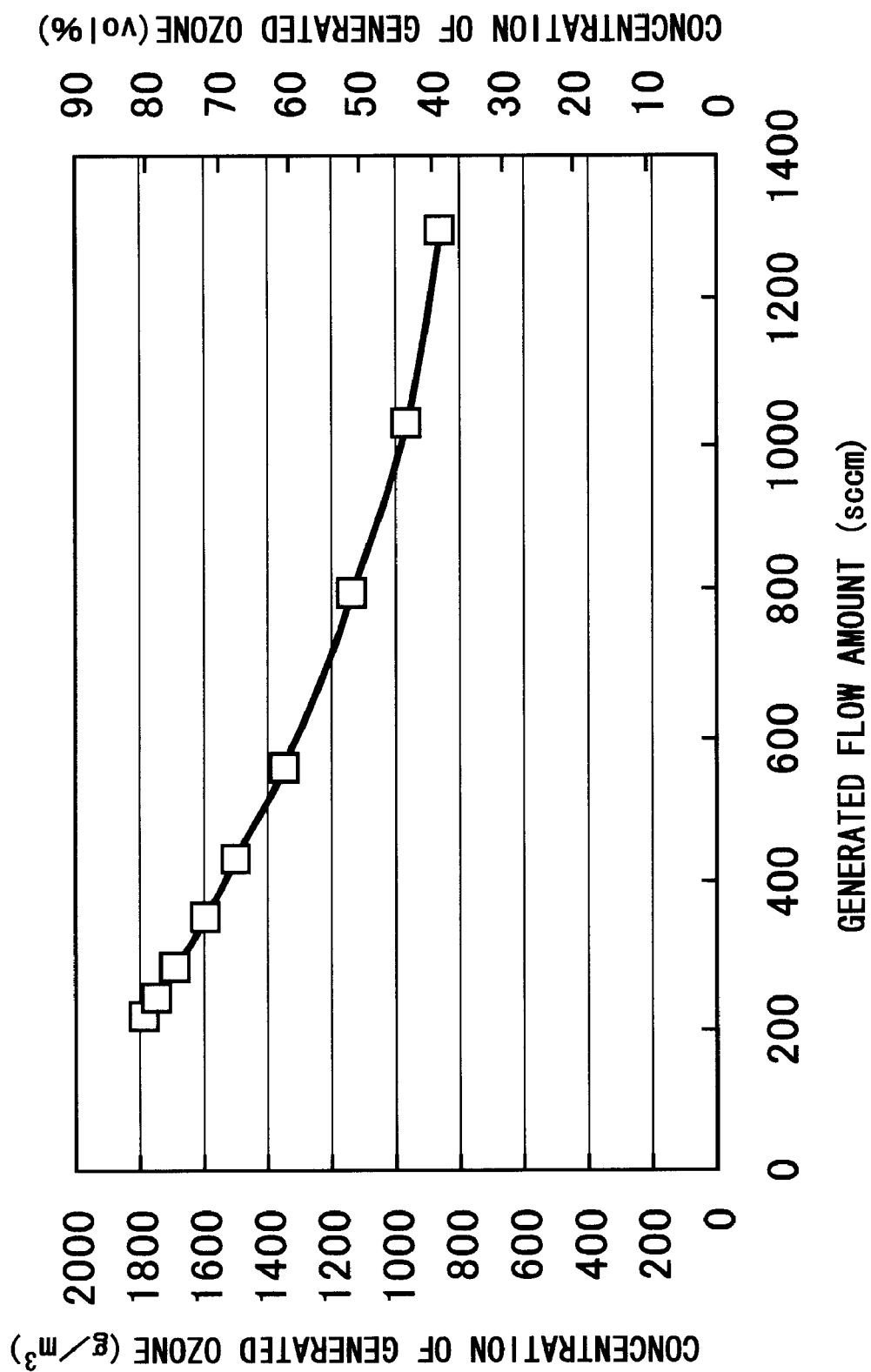
FIG. 3 is a view showing relationships between the generation flow amount and the concentration of generated ozone.

FIG. 2 is a table showing characteristics of the ozone concentrating process in the case where, while the concentration is fixed to about 131 g/m$^3$ (about 6.1 vol %), raw material ozone is supplied at an adsorption flow amount of 15.0 slm to the adsorbing column (2) in which the column capacity per column is 1 liter, and the filling amount of the adsorbent per column is 730 g, and discharge/recovery conditions in desorption are changed. FIG. 3 is a view showing relationships between the generation flow amount and the concentration of the generated ozone.

From FIGS. 2 and 3, it was confirmed that, in the case where, in desorption, after the start of the desorption, discharged gas is evacuated without being recovered, and, after an elapse of a predetermined time period, the led-out gas is recovered, the concentration of the recovered ozone gas is raised in accordance with the time period when the evacuation is continued.

It is seemed that this is caused because, in the initial stage of start of the desorption operation, oxygen-ozone mixture gas which is unadsorbed to the adsorbent in the adsorbing column, and which is in the equilibrium state is preferentially led out, and then the oxygen gas component in which oxygen gas adsorbed to the adsorbent is preferentially desorbed from the adsorbent is led out. When the the recovery procedure is performed after discharge charge conducted for a predetermined time period, therefore, ozone gas having a desired gas concentration can be purified and recovered by adjusting the discharge time after start of the the desorption operation.

In the above, the embodiment in which the adsorbent (1) is maintained in a so-called normal temperature state (left standing state) without being externally provided with any heating or cooling thermal energy has been described. Alternatively, part of cooling chiller which is supplied for cooling the ozone generator (8) may be supplied to the adsorbing columns to remove the heat of reaction between ozone gas and the adsorbent.

Industrial Applicability

The invention is effective not only in the semiconductor production technique, but also in a case where high-concentration ozone gas of about 50 to 80 vols is stably required as an ozone supply source.

The invention claimed is:

1. A method of concentrating ozone gas in which an ozone-oxygen mixture gas is acted in an adsorbing column (2) that is filled with an adsorbent (1), to cause the adsorbent (1) to selectively adsorb ozone gas, and the selectively adsorbed ozone gas is desorbed, thereby concentrating and purifying the ozone gas, wherein
the ozone-oxygen mixture gas is acted on the adsorbent (1) in a non-cooled state to cause the ozone gas to be selectively adsorbed to the adsorbent (1); the adsorbing column (2) is vacuumed when performing an operation of desorbing the ozone gas, thereby desorbing the ozone gas from the adsorbent (1); for a constant time period after start of vacuuming, led-out ozone gas which is led out of the adsorbing column (2) is discarded; and, after elapse of the constant time period, the led-out ozone gas which is led out of the adsorbing column (2) is recovered.

2. A method of concentrating ozone gas according to claim 1, wherein the adsorbent (1) is configured by high-purity silica gel.

3. An apparatus for concentrating ozone gas wherein at least two adsorbing columns (2) each of which is filled with an adsorbent (1) are arranged in parallel to each other, a gas-introduction valve (7), a gas lead-out valve (10), and a gas-discharge valve (17) are attached to each of the adsorbing columns (2), a gas-introduction passage (4) to which an ozone generator (8) is attached is connected to the gas-introduction valve (7), a purified ozone-gas lead-out passage (5) in which a vacuum pump (11) and an passage switching valve (12) are sequentially attached is connected to the gas lead-out valve (10), a gas-discharge passage (6) to which an ozone decomposer (18) is attached is connected to the gas-discharge valve (17), the gas-introduction valve (7) and gas-discharge valve (17) which are attached to each of the adsorbing columns (2) are con-figured to open and close synchronously, the gas-introduction valve (7) and gas lead-out valve (10) which are attached to a same one of the adsorbing columns (2) are controlled to alternatively open, the valves (7), (10), (17) are switchingly controlled so that an adsorbing step in which the adsorbing columns (2) communicate with the gas-introduction passage (4), and a desorbing step in which the adsorbing columns communicate with the purified ozone-gas lead-out passage (5) are alternately repeated, and, in a state where the adsorbing columns communicate with the purified ozone-gas lead-out passage (5), and the passage switching valve (12) is switchingly controlled to a state where purified ozone gas flowing through the purified ozone-gas lead-out passage (5) is discarded, and a state where the purified ozone gas is recovered.

\* \* \* \* \*